Figure 2:
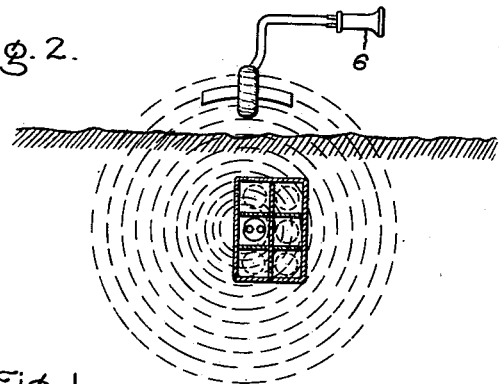

J. B. TAYLOR.
DIFFERENTIALLY CONNECTED EXPLORING COILS.
APPLICATION FILED SEPT. 28, 1915.

1,297,929.

Patented Mar. 18, 1919.

Inventor:
John B. Taylor,
by Albert S. Davis
His Attorney.

UNITED STATES PATENT OFFICE.

JOHN B. TAYLOR, OF SCHENECTADY, NEW YORK, ASSIGNOR TO GENERAL ELECTRIC COMPANY, A CORPORATION OF NEW YORK.

DIFFERENTIALLY-CONNECTED EXPLORING-COILS.

1,297,929.     Specification of Letters Patent.     Patented Mar. 18, 1919.

Application filed September 28, 1915. Serial No. 53,120.

*To all whom it may concern:*

Be it known that I, JOHN B. TAYLOR, a citizen of the United States, residing at Schenectady, county of Schenectady, State of New York, have invented certain new and useful Improvements in Differentially-Connected Exploring-Coils, of which the following is a specification.

My invention relates to electric distribution systems and has for its object an improved method and the provision of means for definitely locating faults or grounds in the conductors of such systems.

One method employed for locating concealed grounds or faults in conductors has been to supply the faulty conductor with an alternating current suitable for inducing an indicating current in an induction coil connected to a telephone receiver or other indicating means, which induction coil is adapted to be carried along in proximity to the grounded conductor, the presence of current in the conductor being indicated by the musical tone or hum of the telephone receiver. When a fault or ground was reached there might be a diminution of sound in the telephone which condition would continue for an indefinite distance beyond the fault due to the fact that the current after reaching the fault would still follow the cable because of the metal sheathing ordinarily used for such conductors. For this reason and for other electrical circuit conditions great difficulty has been frequently experienced in definitely locating the faulty point.

It is the object of my invention to provide a novel method of and means for more definitely locating faults in conductors, and this I accomplish by means of two exploring coils which are differentially connected to a telephone receiver or other sensitive current-responding device, the coils being separated by a substantial distance in the direction of the length of the cable, preferably several feet and adapted to be carried on a motor car or truck which may be driven or otherwise carried along the route of the faulty cable which is supplied with current suitable for giving indication by induced current in the exploring coils. For the testing current for the affected cable, I prefer to employ an alternating current of high frequency such as is produced by a 500 cycle generator. By the arrangement of coils described, absence of sound corresponding to the testing current occurs in case each coil is equally exposed to the testing current in the cable; *i. e.*, so long as the magnitude and phase of the current is the same at points of the cable adjacent to each coil. However, when a fault is reached and passed by one of the coils, unequal induction is set up in the two coils and a sound is produced at the telephone receiver, this being due to the fact that the differential action of the current induced in the two coils does not become zero as is the case when the two coils are equally exposed to the current of the same magnitude and phase. This arrangement produces a very sensitive indicating means, as even a slight ground on the conductor will cause unequal induced currents in the two coils.

Figure 1:
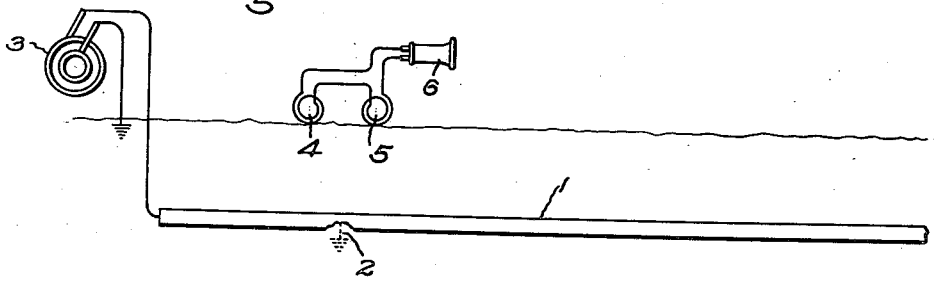

The invention will be more clearly understood by referring to the accompanying drawing, in which Figure 1 illustrates diagrammatically my method of locating faults; Fig. 2 shows a cross-section through an underground cable duct with an indication of the magnetic field extending above the surface of the ground and cutting one of the exploring coils; and Fig. 3 shows the connections of a preferred form of control switches.

Referring to Fig. 1 of the accompanying drawing, 1 indicates an underground conductor having a grounded point 2, which it is desired to locate. For the purpose of detecting the fault 2, the conductor is connected to one side of a generator 3, suitable for supplying it with inducing current, the other side of the generator being connected to ground. The exploring coils 4 and 5 are differentially connected to the telephone receiver 6. The coils are carried over the route of the conductor 1, preferably by mounting them on a motor truck or other vehicle and they are thus exposed to the magnetic field of the testing current as illustrated in Fig. 2. The differential action of the current in the two induction coils, as stated above, being such as to neutralize each other and produce no sound at the receiver so long as they are equally exposed to the magnetic field of the testing current, but as the coil 5 reaches and passes the grounded point 2 in the conductor the current induced in the coil 5 decreases in magnitude and a sound is produced at the receiver 6, thus definitely indicating the location of the fault or ground. For certain combinations of cable conductor, electrostatic capacity and impedances of the several parallel return circuits the current beyond the grounded fault may be equal to, or, in unusual cases, even greater than the cable current on the near side of the fault. This condition will not make the device inoperative unless the "near side" and "beyond" currents are equal and of the same time phase,—a condition so unusual that it may be ignored in practice.

While the exploring coils comprising my invention are normally differentially connected as described above, in actual operation means should be provided to enable the operator to readily change the connections at frequent intervals by cutting out one of the coils when no sound is heard, to make sure he is close to the line of the conductor under test and to make sure that the testing current has not been discontinued or broken at any point. As stated above, the two coils when differentially connected and equally exposed to the influence of the testing current, neutralize each other and no sound is produced at the telephone receiver; therefore by cutting out one of the coils an indication of the presence of the testing current may be obtained.

Figure 3:
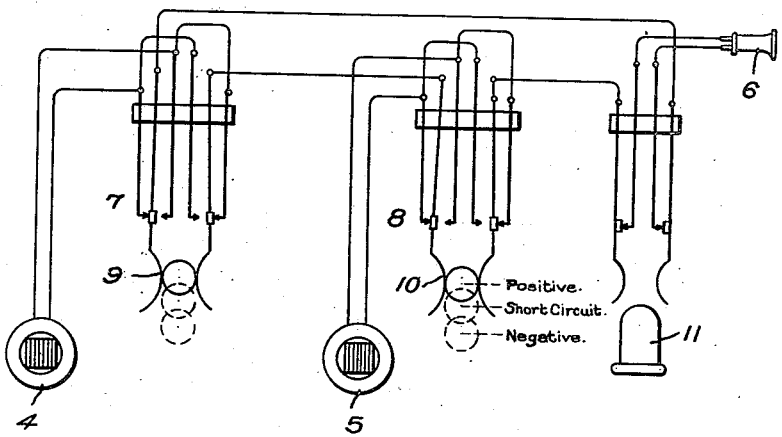

In Fig. 3 is illustrated diagrammatically a switching arrangement for varying the connections of the exploring coils 4 and 5.

The switches 7 and 8 are preferably of a type used on telephone switchboards and comprise short pivoted levers indicated at 9 and 10 respectively, which are easily and quickly moved by a single finger into any one of three positions indicated in the diagram as "positive," "short-circuit" in which the coil is cut out and "negative" in which the connections of the coil are reversed. Throwing one of the switches 9 or 10 to the "negative" position makes the effect of the coils additive and gives more definite indication of feeble currents. A normally-closed push-button switch 11 is provided for disconnecting the coils from the telephone receiver. In strong magnetic fields some telephone receivers will give a sound even though there is no current in the windings and the open-circuiting switch 11 is provided to enable the operator to determine and make allowance if necessary for this effect.

I have shown and described the principle of my invention as embodied in a preferred form, but it will be understood that the arrangement is subject to modification and I aim in the appended claims to cover all modifications which do not depart from the spirit and scope of my invention.

What I claim as new and desire to secure by Letters Patent of the United States, is,—

1. Means for locating a fault in a conductor supplied with a suitable inducing current, comprising two induction coils spaced a substantial distance apart along the length of the conductor and adapted to be carried along in proximity to the faulty conductor and a sensitive current responding device connected in series with said coils, said coils being so connected that the currents induced normally in the two coils tend to flow in opposite directions through said current responsive device.

2. Means for locating a fault in a conductor supplied with a suitable inducing current, comprising two induction coils spaced a substantial distance apart along the length of the conductor and adapted to be carried along in proximity to the faulty conductor and a sensitive current responding device connected in series with said coils, said coils being so connected that the currents induced normally in the two coils tend to flow in opposite directions through said current responsive device; and means for short circuiting either of said induction coils.

3. Means for locating a fault in a conductor supplied with a suitable inducing current, comprising two induction coils spaced a substantial distance apart along the length of the conductor and adapted to be carried along in proximity to the faulty conductor, and a sensitive current responding device connected in series with said coils, said coils being so connected that the currents induced normally in the two coils tend to flow in opposite directions through said current responsive device, and means for obtaining an indication of the inducing current comprising switching means for varying the connections of the two induction coils.

4. Means for locating a fault in a conductor comprising a source of current for supplying a suitable inducing current to the conductor, a pair of induction coils adapted to be carried along in proximity to the faulty conductor and a current responding device connected in circuit with said coils, said coils being so connected to the current responding device and so spaced from each other along the length of the cable that when both coils are between the fault and the source of current substantially no current will flow in the current responding device, and when the coils are on opposite sides of the fault an appreciable current will flow in the current responding device.

5. Means for locating a fault in a conductor comprising a source of current for supplying a suitable inducing current to the conductor, a pair of induction coils adapted to be carried along in proximity to the faulty conductor and a current responding device connected in series with said coils, said coils being spaced apart a substantial distance along the length of the conductor, the axes of said coils extending transversely of the axis of the conductor without intersecting the same, and said coils being so connected that the currents induced normally in the two coils tend to flow in opposite directions through said current responding device.

6. Means for locating a fault in an underground conductor comprising a source of current for supplying a suitable inducing current to the conductor, a pair of induction coils adapted to be carried along the surface of the ground above the conductor and a current responding device connected in circuit with said coils, said coils being spaced apart a substantial distance along the length of the cable, and being so connected that the currents induced normally in the two coils tend to flow in opposite directions through said current responding device.

7. The method of locating a fault in a conductor which consists in supplying a suitable inducing current to said conductor and carrying along the length of the conductor at substantially equal distances therefrom a pair of differentially connected induction coils which are separated by a substantial distance until an indication is obtained in a current responding device connected to said coils.

8. The method of locating a fault in a conductor which consists in supplying a suitable inducing current to said conductor and carrying along the length of the cable a pair of induction coils which are separated from each other by a substantial distance and so connected to a current responding device that when both coils are between the fault and the source of current substantially no current will flow in the current responding device, and when the coils are on opposite sides of the fault an appreciable current will flow in the current responding device.

9. The method of locating a fault in an underground conductor which consists in supplying a suitable inducing current to said conductor and carrying along the surface of the earth above said conductor in the direction through which the conductor extends and at substantially equal distances therefrom a pair of differentially connected induction coils seperated by a substantial distance until an indication is obtained in a current responding device connected to said coils.

In witness whereof, I have hereunto set my hand this 27th day of September, 1915.

JOHN B. TAYLOR.